US009338048B2

(12) United States Patent  
Grimminger et al.

(10) Patent No.: US 9,338,048 B2  
(45) Date of Patent: May 10, 2016

(54) MOBILE COMMUNICATIONS TERMINAL FOR USE IN SEVERAL WIRELESS LOCAL NETWORKS AND METHOD FOR OPERATING

(75) Inventors: Jochen Grimminger, München (DE); Wolfgang Gröting, Oberhausen (DE); Michael Schielein, München (DE); Abigail Surtees, Romsey (GB)

(73) Assignee: Siemens Aktiengesellschaft, Munich (DE)

( * ) Notice: Subject to any disclaimer, the term of this patent is extended or adjusted under 35 U.S.C. 154(b) by 1636 days.

(21) Appl. No.: 11/659,218

(22) PCT Filed: Jun. 22, 2005

(86) PCT No.: PCT/EP2005/052909  
§ 371 (c)(1),  
(2), (4) Date: Jan. 26, 2009

(87) PCT Pub. No.: WO2006/015902  
PCT Pub. Date: Feb. 16, 2006

(65) Prior Publication Data  
US 2010/0290440 A1    Nov. 18, 2010

(30) Foreign Application Priority Data  
Aug. 4, 2004   (DE) ................. 10 2004 037 839

(51) Int. Cl.  
*H04L 12/66* (2006.01)  
*H04W 4/00* (2009.01)  
*H04L 29/12* (2006.01)  
*H04W 8/26* (2009.01)  
*H04W 74/00* (2009.01)  
*H04W 84/12* (2009.01)

(52) U.S. Cl.  
CPC ........ *H04L 29/1232* (2013.01); *H04L 61/2015* (2013.01); *H04L 61/2092* (2013.01); *H04W 8/26* (2013.01); *H04W 74/00* (2013.01); *H04W 84/12* (2013.01)

(58) Field of Classification Search  
CPC ...... H04W 8/087; H04W 36/08; H04W 80/04  
USPC ................. 370/338, 401, 463; 455/434, 435.1  
See application file for complete search history.

(56) References Cited

U.S. PATENT DOCUMENTS

| | | | |
|---|---|---|---|
| 6,708,033 B1 | 3/2004 | Linkola et al. | |
| 6,763,012 B1 | 7/2004 | Lord et al. | |
| 7,526,762 B1 * | 4/2009 | Astala et al. | 717/171 |
| 2002/0035699 A1 * | 3/2002 | Crosbie | 713/201 |
| 2002/0124058 A1 * | 9/2002 | Ehrensvard | 709/219 |
| 2002/0132620 A1 | 9/2002 | Saint-Hilaire et al. | |
| 2002/0154627 A1 | 10/2002 | Abrol et al. | |
| 2003/0226017 A1 * | 12/2003 | Palekar et al. | 713/168 |
| 2003/0235176 A1 * | 12/2003 | Zhang et al. | 370/338 |
| 2004/0014467 A1 * | 1/2004 | O'Neill et al. | 455/422.1 |
| 2004/0064591 A1 * | 4/2004 | Noble | 709/250 |
| 2004/0120260 A1 | 6/2004 | Bernier et al. | |
| 2005/0080927 A1 * | 4/2005 | Anderson et al. | 709/245 |
| 2005/0107109 A1 * | 5/2005 | Gunaratnam et al. | 455/525 |

FOREIGN PATENT DOCUMENTS

| | | |
|---|---|---|
| DE | 102 11 575 A1 | 10/2003 |
| EP | 1 349 321 A2 | 10/2003 |
| EP | 1 432 198 A1 | 6/2004 |
| WO | 2004/045157 A1 | 5/2004 |

OTHER PUBLICATIONS

W. Xing et al., "M-SCTP Design and Prototypical Implementation of an End-to-End Mobility Concept," Procedings of the 5th Intl. Workshop on Internet Challenge: Technology and Appliations, Berlin, 2002, pp. 1-8.  
International Search Report for Application No. PCT/EP2005/052909; mailed Nov. 7, 2005.  
W. Xing et al., "M-SCTP: Design and Prototypical Implementation of an End-to-End Mobility Concept," Procedings of the 5th Intl. Workshop on Internet Challenge: Technology and Appliations, Berlin, 2002, pp. 1-8.

* cited by examiner

*Primary Examiner* — Dang Ton  
*Assistant Examiner* — Ryan Kavleski  
(74) *Attorney, Agent, or Firm* — Slayden Grubert Beard PLLC

(57) ABSTRACT

The invention relates to a mobile communications terminal for use in a plurality of wireless local networks. Said terminal comprises a log on memory, in which an access address that is designed to be used for a new log on process is stored. According to the invention, information concerning the access addresses that were received by the mobile communications terminal in previous log on operations and the network among the plurality of wireless local networks that was used, is stored in an allocation memory. The terminal is configured in such a way that when a new access request is received for a sought network among the plurality of wireless local networks, it searches for a previous access address that was allocated for the sought network and is also configured in such a way that when said previous access address for the sought network has been found, it writes the address to the log on memory and permits the log on operation. The invention also relates to a method for managing log on information that is designed for the mobile communications terminal.

14 Claims, No Drawings

MOBILE COMMUNICATIONS TERMINAL FOR USE IN SEVERAL WIRELESS LOCAL NETWORKS AND METHOD FOR OPERATING

CROSS-REFERENCE TO RELATED APPLICATIONS

This application is based on and hereby claims priority to European Application No. 10-2004-037-839.8 filed on Aug. 4, 2004.

BACKGROUND

The invention relates to a mobile communications terminal for use in a plurality of wireless local networks and to a method, especially a log on method, for said terminal.

What is referred to as a "DHCP" server is known in the prior art. The task of this server is to allocate to mobile communications terminals looking for access to a wireless local network a usually temporary access address for this network, with such access addresses generally being referred to as IP addresses, provided the associated IP protocol is used for the communications link.

A known mobile communications terminal features a separate memory for the last access address for a specific wireless local network allocated to it in each case. This last access address is thus linked to that network in the plurality of wireless local networks in which the mobile communications terminal was last logged on.

With this type of mobile communications terminal it is seen as disadvantageous that a new communications link has to be established for each request for access to a wireless local network, in which case a new access address is to be issued by the server in each case. The sole exception is if the mobile communications terminal requests one and the same wireless local network in two consecutive sessions. In this case the mobile communications terminal can within one log on process transmit the last IP address read out from the log on memory as an access address when logging on to the DHCP server, after which the DHCP server checks whether it can allocate to the mobile communications terminal the access address which has already been used earlier for the sought network to which it belongs. If this access address is free the new communications link to the network sought can be established under the same access address.

Using this as its starting point, the object of the invention is to specify a mobile communications terminal for use in a plurality of wireless local networks as well as a suitable method for operation of said terminal in which the setup of communications links in different wireless local networks is simplified.

SUMMARY

An embodiment includes a mobile communications terminal for use in a plurality of wireless local networks. A mobile communication terminal includes a logon memory storing an access address provided for a new logon process, an allocation memory storing information about which prior access addresses the mobile communications terminal has received in which of the wireless local networks in previous logon processes, and a programmed processor searching, in response to a new access request for a sought network among the wireless local networks, for an earlier access address issued to the mobile communications terminal for the sought network and, upon finding the earlier access address, writing the earlier access address into the logon memory and transmitting the earlier access address for a logon process.

BRIEF DESCRIPTION OF THE DRAWINGS

These and other objects and advantages of the present invention will become more apparent and more readily appreciated from the following description of the preferred embodiments, taken in conjunction with the accompanying drawings of which:

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

This object is achieved for the mobile communications terminal of the type mentioned at the start by storing in an allocation memory of the mobile communications terminal information relating to which access addresses the mobile communications terminal has received in which of the plurality of wireless local networks during earlier log on processes, it is embodied such that an on the basis of a new access request to a network sought from a plurality of wireless local networks, after an earlier access address issued to it, it searches for the required network and it is embodied such that, when it finds the earlier access address for the sought network, it writes this into the log on memory and transmits it for a log on process.

Because of the measure that earlier access addresses issued are stored in the allocation memory of the mobile communications terminal, and because this is done in combination with the associated wireless network, the establishment of a communications link to the network already selected earlier is significantly simplified. It is namely made possible for the mobile communications terminal to find the earlier access address for the sought network in its allocation memory and the same access address is used for the new log on process at the same wireless local network. In this respect any additional effort involved in setting up the communications link which is connected with issuing a new access address is avoided.

Preferably the mobile communications terminal is embodied such that, in the event of an access address being invalid for one of the plurality of wireless local networks, a new access address is requested from the wireless local network associated with the access address. This means that the mobile communications terminal always has available to it, for wireless local networks which it has already dialed into, a valid access address assigned to the mobile communications terminal. In this respect it is possible, in the event of an initially issued access address becoming invalid within the course of a session with one of the plurality of wireless local networks, to switch over to the new access address without any interruption of the session being required. This means that the user of the mobile communications terminal is not aware of the transition from the old to the new access address when conducting their session in the wireless local network.

The mobile communications terminal can be equipped as a so-called multi-mode device. In this case it has a plurality of air interfaces which can each maintain a communications connection with one of the plurality of local networks. With the aid of the information contained in the allocation memory a simple switchover between the individual air interfaces is possible. The invention can of course also be used with so-called single mode communications terminals however, in which a single air interface, for example a WLAN interface, is provided.

The mobile communications terminal can be embodied as a DHCP client, in which case the log on memory contains an access address last issued by one of the plurality of wireless local networks to the mobile communications terminal, and is also able to be overwritten by the earlier access address of the requested wireless local network. This embodiment refers back to the design of known mobile communications terminals in which this separate memory is provided with the last access address issued. As a result of the inventive embodiment of the mobile communications terminal there is the additional feature of the last access address issued to the mobile communications terminal being able to be overwritten by an access address which is read out from the memory for earlier communications links.

The access address is a necessary component of the content of the memory for previously used access addresses for the wireless local networks into which the terminal has previously dialed. Naturally further information in relation to the access address can be stored on the server. Preferably this is security or authentication information required for making use of specific services of the wireless local networks.

To simplify the process of finding an access address issued earlier for a sought wireless local network, this access address can be stored in an allocation memory in combination with position information or other information suitable for reflecting the wireless local network sought previously. With a WLAN network such information is preferably the "SSID" or the "MAC" address of the wireless local network concerned.

The object given above is achieved as regards the method by a method for administering log on information for a mobile communications terminal for setting up communications links in a plurality of wireless local networks, whereby, for a new log on process, an access address is read out from a log on memory, whereby information is stored in an allocation memory of the mobile communications terminal about which access addresses in which of the plurality of wireless local networks the mobile communications terminal has received during earlier log on processes, the mobile communications terminal, as a result of a new access request, searches for a sought network from a plurality of wireless local networks according to an earlier access address allocated to it for the sought network in the allocation memory, and the mobile communications terminal, on finding the earlier access address for the sought network, writes this into the log on memory and transmits it for a log on process.

Further embodiments of such a method are described in subclaims 10 to 13. The features of these method claims have already been explained with reference to the discussion of the mobile communications terminal described above.

Exemplary embodiments of the invention will be explained in greater detail below.

The user of a laptop, as an example of a mobile communications terminal, which is equipped with a WLAN card, contacts a WLAN network A. Within the framework of the log on process which then takes place, the communications terminal is allocated the IP address a.b.c.d. by a DHCP server. The mobile communications terminal has a log on memory in which the last IP address allocated to the mobile communications terminal is stored.

The memory value of the separate memory for the last IP address issued is overwritten as a result of the log on process so that it now contains the access address a.b.c.d. In addition to this overwriting process, the following information is stored in an allocation memory in the mobile communications terminal: "Network A: last IP access address=a.b.c.d".

If the user of the laptop now leaves the reception area of the WLAN network A and enters the area of a WLAN network B, the following occurs: WLAN network B is contacted. The mobile communications terminal first checks the allocation memory and establishes that no log on information is present for network B. In this case the DHCP stack uses the last known access address information (from the log on memory), namely a.b.c.d., to log on to network B. However this access address is unknown to network B so that it assigns to the mobile communications terminal via the DHCP server an access address specific for network B, namely 12.34.56.78. This value is read into the log on memory for last IP address issued and thereby the previous value for the network A is overwritten. In such cases it can occur that a few of the services used by the user via the access to network A are no longer provided by network B, so that only those services which are supported both by network A and also by network B can continue to be used. Also services not supported by network B but which remain valid if the user re-enters the transmission area of network A can be resumed again with this access address.

If the mobile communications terminal now goes back into the area of WLAN network A, this network A is contacted again. The services maintained in network B can in principle be used again with the access address a.b.c.d issued for network A.

On arrival in the area of network A the DHCP stack checks after recognizing network A whether an earlier access address, namely the address a.b.c.d., is present in the allocation memory for this network. The search process required for this is based on information in the allocation memory. For each wireless local network already sought earlier this contains the IP address issued at the time, in combination with information which identifies the network concerned. This information can, based on a GPS system for example, be positioning information. As an alternative or in addition, the IP addresses issued earlier can also be stored in combination with an "SSID" of a WLAN network or its "MAC" address. After this address is found, the content of the log on memory is overwritten for the last IP address issued with the value "a.b.c.d." i.e. the memory value is changed from "12.34.56.78" to "a.b.c.d." and transferred to the DHCP server of network A. The DHCP server then assigns to the mobile communications terminal the access address already used earlier for network A so that there is no need to organize new communications links. This obviously means a time-saving for the user of the laptop.

The embodiment of the server just explained is especially useful for multi-mode communications terminals, i.e. those wishing to simultaneously maintain communications connections to network A and also to network B. Such multi-mode communications terminals can especially be equipped with a number of air interfaces which support different mobile radio standards. Examples are WLAN, Bluetooth, GSM and UMTS services. If the mobile communications terminal is located within range of several such mobile networks, the switchover between the different networks can be made in a simpler manner by a suitable access to the relevant previously allocated access address.

In a second exemplary embodiment of the invention the user again contacts the WLAN network A and obtains via the DHCP server the access address a.b.c.d., so that the value "a.b.c.d." is stored in the log on memory for the last address issued.

The user wishes to make a "VoIP" call using a GPRS interface of their laptop, and wishes to have their call switched via a GPRS network C. The laptop directs a request via the DHCP server to the network C for allocating an IP access address usable for the call. The mobile communications terminal uses the value in the log on memory for the last IP address issued, in this case a.b.c.d., for WLAN network A, to establish a communications connection to the network C. Network C cannot process this IP address, and via its DHCP server assigns to the mobile communications terminal, namely the laptop, the IP address "90.23.56.89" valid for network C. This address allocation method is reflected in the fact that the value now stored in the log on memory for the last IP address issued is "90.23.56.89" and replaces the value "a.b.c.d." which was there previously. In the course of this operation information is stored in the allocation memory for earlier IP addresses issued, indicating to the GPRS network C that the last IP access address issued has the value "90.23.56.89".

The allocation memory thus now contains the following information:

Network A: last IP access address="a.b.c.d" and
Network C: last IP access address="90.23.56.89".

If the temporary access address "a.b.c.d." issued for WLAN network A now expires, the DHCP stack of the mobile communications terminal automatically directs a request to WLAN network A to issue a new IP access address, for example c.d.e.f.

However it is known to the mobile communications terminal that the last IP address issued for network A has the value "a.b.c.d.", so that the value "c.d.e.f." is replaced in the memory of the DHCP server by the value "a.b.c.d".

The DHCP server in the WLAN network A can issue this new access address as if the connection to the GPRS network C had never happened, so that it is not necessary to abort the use of any service or to reorganize it. In this way user friendliness is significantly improved.

The factor common to the present exemplary embodiments is that the access address which is selected for the "requested access address" of a DHCP DISCOVER or DHCP REQUEST notification is not necessarily the last IP access address which has been processed by the DHCP stack. As a result of this advantages emerge for applications of mobile communication terminals and/or multimode communication terminals. Similar procedures can also be used for other methods for access address allocation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention, the scope of which is defined in the claims and their equivalents.

The invention claimed is:

1. A mobile communications terminal for use in a plurality of wireless local networks, comprising:
an allocation memory storing information of prior access addresses the mobile communications terminal has received in association with identifiers of the wireless local networks in previous logon processes; and
a programmed processor configured to:
search for an access address among the prior access addresses that are previously issued by any one of the wireless local networks to the mobile communications terminal using an identifier of a sought network, the search being in response to a new access request for the sought network among the wireless local networks,
transmit the access address for a logon process of the sought network, upon finding the access address as a result of the search, and
wherein the access address of said any one of the wireless local networks is re-allocated to the mobile communications terminal for the logon process of the sought network where no session re-establishment is necessary according to the search finding the access address, and writing an access address directed to the sought network in a logon memory subsequent to the logon process to the sought network using the re-allocated access address of said any one of the wireless local networks when the search results in other than finding access address.

2. The mobile communications terminal as claimed in claim 1, wherein, if the access address is invalid for the sought network, said processor requests a new access address from the sought network.

3. The mobile communications terminal as claimed in claim 2, wherein a plurality of communication connections to different networks of the wireless local networks are supported by the mobile communications terminal.

4. The mobile communications terminal as claimed in claim 3, wherein the mobile communications terminal is a Dynamic Host Configuration Protocol client and said logon memory contains a last access address issued by one of the wireless local networks to the mobile communications terminal and is able to be overwritten by the access address of the sought network.

5. The mobile communications terminal as claimed in claim 4, wherein at least one of additional security information and network information which is linked to each of the access addresses is stored for the wireless local networks in the mobile communications terminal.

6. The mobile communications terminal as claimed in claim 5, wherein the information in the allocation memory representing an associated wireless local network is allocated to earlier issued access addresses.

7. The mobile communications terminal as claimed in claim 6, wherein the information representing the wireless local network is position information.

8. The mobile communications terminal as claimed in claim 6, wherein the information representing of the wireless local network is at least one of a Service Set Identifier and a Medium Access Control address.

9. A method for administering logon information in a mobile communications terminal for setting up communications links in a plurality of wireless local networks, comprising:
store, in an allocation memory of the mobile communications terminal, information of prior access addresses the mobile communications terminal has received in association with identifiers of the wireless local networks during previous logon processes;
search, for an access address among the prior access addresses previously that are issued by any one of the wireless local networks to the mobile communications terminal using an identifier of a sought network, the search being in response to a new access request for the sought network among the wireless local networks; and transmit the access address for a logon process of the sought network, upon finding the access address as a result of the search, and wherein the access address of said any one of the wireless local networks is re-allocated to the mobile communications terminal for the logon process of the sought network where no session re-establishment is necessary according to the search finding the access address, and writing an access address directed to the sought network in a logon memory subsequent to the logon process to the sought network using the re-allocated access address of said any one of the wireless local networks when the search results in other than finding the access address.

10. The method in accordance with claim 9, further comprising requesting, if the access address is invalid for the sought network, a new access address from the sought network.

11. The method as claimed in claim 9, wherein the mobile communications terminal supports a plurality of communications links between one of the wireless local networks and the mobile communications terminal under a single access address.

12. The method in accordance with claim 11, wherein the mobile communications terminal is a Dynamic Host Configuration Protocol client, further comprising:

storing a last access address issued by one of the plurality of wireless local networks to the mobile communications device in the logon memory; and overwriting the last access address when the access address of the sought network is found.

13. The method in accordance with claim 12, further comprising storing in the mobile communications terminal at least one of security information and network information linked to each of the access addresses for the wireless local networks.

14. The method in accordance with claim 11, wherein the logon process of the mobile communications terminal is implemented using the access address without interruption of a session.

\* \* \* \* \*